(12) United States Patent
Town et al.

(10) Patent No.: US 10,924,934 B2
(45) Date of Patent: Feb. 16, 2021

(54) DEVICE OBFUSCATION IN ELECTRONIC NETWORKS

(71) Applicant: Arm IP Limited, Cambridge (GB)

(72) Inventors: Samuel Marc Town, Cambridge (GB); Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 133 days.

(21) Appl. No.: 16/191,024

(22) Filed: Nov. 14, 2018

(65) Prior Publication Data
US 2019/0159035 A1 May 23, 2019

(30) Foreign Application Priority Data

Nov. 17, 2017 (GB) ..................................... 1719050
Nov. 17, 2017 (GB) ..................................... 1719051

(51) Int. Cl.
*H04W 12/12* (2009.01)
*H04L 29/06* (2006.01)
*G06F 21/57* (2013.01)

(52) U.S. Cl.
CPC ........ *H04W 12/1204* (2019.01); *G06F 21/57* (2013.01); *H04L 63/1416* (2013.01); *H04L 63/1441* (2013.01)

(58) Field of Classification Search
CPC ........... H04W 12/1204; H04L 63/1416; H04L 63/1441; G06F 21/57
See application file for complete search history.

(56) References Cited

U.S. PATENT DOCUMENTS

2012/0084866 A1 4/2012 Stolfo
2014/0115706 A1 4/2014 Silva et al.
2017/0093910 A1* 3/2017 Gukal ................. H04L 63/1416
2017/0244732 A1 8/2017 Manjunath et al.
2017/0289317 A1* 10/2017 Seemann ................ H04L 69/08
2017/0310704 A1 10/2017 Wu et al.
2019/0098021 A1* 3/2019 Farmer ................... H04L 63/20

FOREIGN PATENT DOCUMENTS

| CN | 105721417 A | 6/2016 |
| EP | 2677792 A1 | 12/2013 |
| WO | WO 2017/053806 A1 | 3/2017 |
| WO | WO 2017/163008 A1 | 9/2017 |

OTHER PUBLICATIONS

Search Report dated May 18, 2018 for GB Application No. 1719051.3, 8 pages.
Search Report dated May 18, 2018 for GB Application No. 1719050.5, 8 pages.
Examination Report dated Jul. 2, 2020 for GB Application No. 1719051.3, 4 pages.

* cited by examiner

*Primary Examiner* — Nelson S. Giddins
(74) *Attorney, Agent, or Firm* — Patterson Thuente Pedersen, P.A.

(57) ABSTRACT

A method, electronic apparatus and computer program for device obfuscation in electronic networks, comprising determining at least one device type of at least one physical device operable to be at least intermittently attached to a wireless network; generating a pattern of wireless network activity associated with the at least one device type; exposing over the wireless network a plurality of non-functional messages conforming to the pattern; and operating a purported sender and receiver of each of the plurality of messages to obscure at least one of an exploitable characteristic and an exploitable state of the at least one device type with respect to the wireless network.

16 Claims, 6 Drawing Sheets

Method 500

DEVICE OBFUSCATION IN ELECTRONIC NETWORKS

RELATED APPLICATIONS

The present application claims priority to GB Application No. 1719051.3 filed Nov. 17, 2017 and GB Application No. 1719050.5 filed Nov. 17, 2017, each of which is hereby incorporated herein in its entirety by reference.

The present technology relates to methods and apparatus for improving physical and electronic security in networks of electronic devices where the networks have wireless portions.

In networked computing environments, wireless portions of a network, such as a WiFi (RTM) network may be vulnerable to malicious interference—wireless messages may be observed and used to interpret user or device behaviour and to interfere with networked devices for malicious purposes.

In a first approach to the many difficulties encountered in seeking physical and electronic security, the present technology provides a machine-implemented method, comprising determining at least one device type of at least one physical device operable to be at least intermittently attached to a wireless network; generating a pattern of wireless network activity associated with the at least one device type; exposing over the wireless network a plurality of non-functional messages conforming to the pattern; and operating a purported sender and receiver of each of the plurality of messages to obscure at least one of an exploitable characteristic and an exploitable state of the at least one device type with respect to the wireless network.

Implementations of the disclosed technology will now be described, by way of example only, with reference to the accompanying drawings, in which.

With present-day computing and communications technology, locations such as homes, offices, industrial plants and the like contain many electronic devices, and these devices are often linked in networks. With the evolution of the Internet of Things (IoT), many items of hardware that were traditionally disconnected from the rest of the world are now connected, by wired or wireless means, to one another and to the wider electronic environment. It is not uncommon for a home to have numerous connected devices with computing and communications capacity built in, such as heating and cooling systems, lighting systems, security systems, entertainment systems, and household utility devices such as refrigerators, freezers and washing machines. In many cases, people in the home may be connected, at least intermittently, to other devices by for example a mobile (cell) phone or another portable device, such as a wearable personal device.

At least some parts of such a network may operate wirelessly, and this offers a range of opportunities for malicious exploitation by the ill-disposed, whether the exploitation takes the form of electronic misdeeds, such as stealing bank details, or of physical actions, such as burglary. Malicious "drive-by" penetrations of systems are facilitated by the wireless nature of the communications, and these penetrations can have damaging consequences.

For example, by observing traffic patterns on a wireless network, it might be possible to detect typical times of day when occupants of a home or other location are present and when they are absent. In one example, wearable devices may be observed if they are present—an absence of such devices might be taken to mean that the occupants are absent, and that it is thus a propitious time for making an illegal entry into the property. It might also be possible to wirelessly observe the behaviour of guards with respect to electronic security systems, such as passive infrared (PIR) motion detectors, alarms and security cameras, by detecting a guard's patrolling times and locations, thereby easing the illegal entry even further.

As is well-known to those of skill in the art, many other exploits are possible, when once a malicious intruder has access to the network and knowledge of the behaviour of the various connected devices.

In one example case, it may be possible to invade the system to simulate financial transactions with a regular payee, as observed over a period, and to "hijack" the payments by manipulating the payee details in a transaction message. These are merely examples of the exploits that may be available if unsanctioned message activity can be inserted into a wireless system in such a manner as to fit in with previously observed traffic patterns. As is well-known to those of skill in the art, many other exploits are possible, when once a malicious intruder has access to the network and knowledge of the behaviour of the various connected devices.

In one special case, it might be possible for an online intruder to use an unsanctioned message or message flow to deauthenticate a device on the network either for the purpose of substituting an imposter device under the control of the intruder after re-establishing the connection with the wireless access point, or perhaps for the purpose of switching off a security camera or the like.

Wirelessly-connected devices are thus susceptible to attacks in which an attacker sends a spoofed wireless message, for example causing a targeted device to become disconnected from the network or to perform some other malicious action. The spoofed frame may be generated, for example, using MAC addresses sniffed from observing network traffic. The attacker can send a spoofed frame to the access point which is supposedly from an attached device, to an attached device supposedly from the access point, or from one attached supposed device to a peer device in a peer-to-peer mesh arrangement. By such means, the attacker can gain access to the network for unsanctioned purposes.

Beyond mere annoyance (for example. interrupting network traffic for a device while it reconnects to the network), this type of attack can be used to knock security devices such as Internet of Things (IoT) security cameras and passive infrared (PIR) sensors off the network before a physical intrusion, or as a precursor to password cracking attacks by repeated triggering of handshake messages which can be observed by the attacker.

Wirelessly-connected devices are thus susceptible to attacks in which an attacker probes a network, using for example, MAC addresses sniffed from observing network traffic.

The present technology thus provides a technique for obfuscating information about the devices attached to a wireless network to mitigate profiling attempts by a malicious party. An eavesdropper on wi-fi network activity can determine a lot of information about the devices attached to that network, without joining it. For example, by observing MAC addresses, an observer can determine what devices are present on the network (including manufacturer and model information), and when they are communicating. This could, for example, tell a burglar whether a particular location contains high value electronics, or what networked security equipment is present. This information could also tell an attacker whether there is any equipment attached to the network which has known vulnerabilities which can be exploited. Traffic analysis could also be used to infer whether anyone is "home" at the target location, for example by watching traffic volume from passive infrared sensors, internet connected cameras, or the presence of personal or wearable electronics on the network (smartphone, smartwatch, activity tracker etc.).

The present technology provides a method for obfuscating this information by virtualising a number of false connected wi-fi devices which simulate genuine network activity. This behaviour could be provided by a modified wi-fi access point, a standalone wi-fi device, or a modified existing wi-fi device. By virtualising a number of different devices, the identity of the genuine physical devices attached to the network is hidden. This greatly increases the difficulty for a malicious party of profiling a household or other location, and makes it harder for an attacker to select exploits as they do not know which devices (and therefore which vulnerabilities) are real.

Metaphorically, the purported or virtualised devices act like "window"—the metal foil scattered by aircraft to confuse RADAR by providing a flood of false signals along with the true signal. So here the purported or virtualised devices may appear to flood the network with non-functional message traffic to obscure the state and characteristics of any actual devices that may be from time to time attached to the network, without affecting the real traffic of the network.

It will be clear to one of ordinary skill in the art that intrusions of the sort exemplified above pose a significant threat in a home setting—the threat is even greater in the case of an industrial plant, in which the analysis and misuse of systems by the ill-disposed could have dangerous consequences. Interference with systems controlling chemical or physical processes in such a plant could cause costly damage or even danger to personnel.

Figure 1:
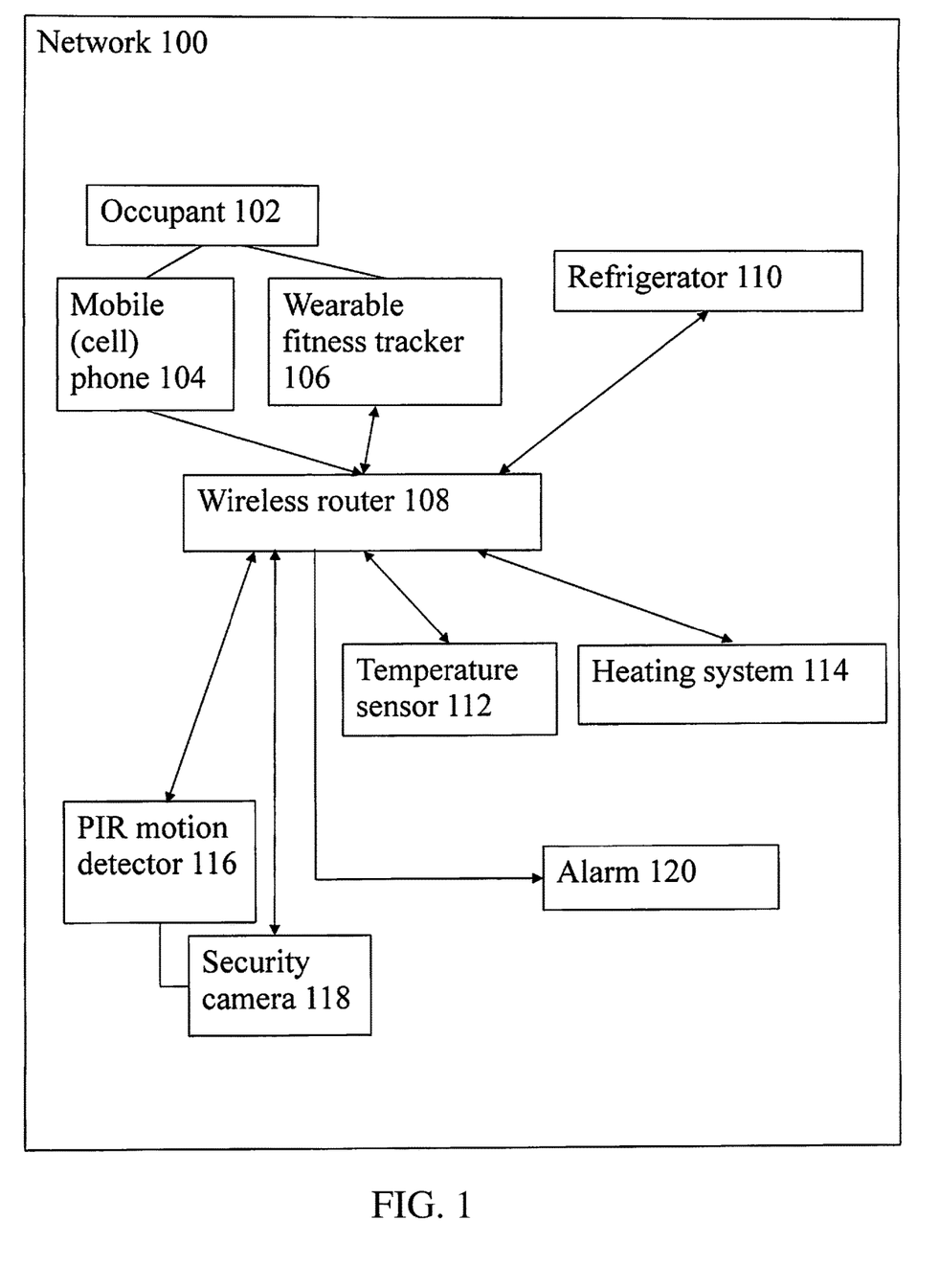
FIG. 1 shows a block diagram of an exemplary network in a home equipped with several interconnected devices.

In FIG. 1, there is shown a block diagram of an exemplary network in a home equipped with a number of interconnected devices. It will be clear to one of ordinary skill in the art that the block diagram represents a very simple arrangement. In a real-world setting, many homes, office and other premises have much more complex networks. In FIG. 1 are shown a network in which an occupant 102 may carry a mobile (cell) phone 104 and be wearing a personal device, such as wearable fitness tracker 106. The wireless portion of the network according to this and other embodiments may comprise devices operable with various wireless protocols, including WiFi®, Z-Wave, ZigBee, Bluetooth, and the like. Central to the network is a central wireless access point, such as wireless router 108. The network also comprises a connected "smart" refrigerator 110, which is operable to detect the product codes of perishable products and warning occupant 102, via mobile (cell) phone 104 when a refrigerated product has reached the end of its usable life. Further connected to wireless router 108 is temperature sensor 112, which may, for example, communicate with occupant 102 via wireless router 108 and mobile (cell) phone 104 to control heating system 114. In addition, passive infrared (PIR) motion detector 116, which may be connected to security camera 118, is connected to the wireless router 108, by means of which alarm 120 may be sounded if necessary. If a network such as that shown in FIG. 1 is penetrated by a malicious intruder, the attached devices may be misused to, for example, indicate that a user is not present in the location, or to provide an attack surface for malicious exploits. For example, the normal behaviour of devices that are profiled by an attacker may be taken over and the devices may then be controlled, disabled, or otherwise misused to the attacker's advantage and to the detriment of the legitimate user.

Figure 2:
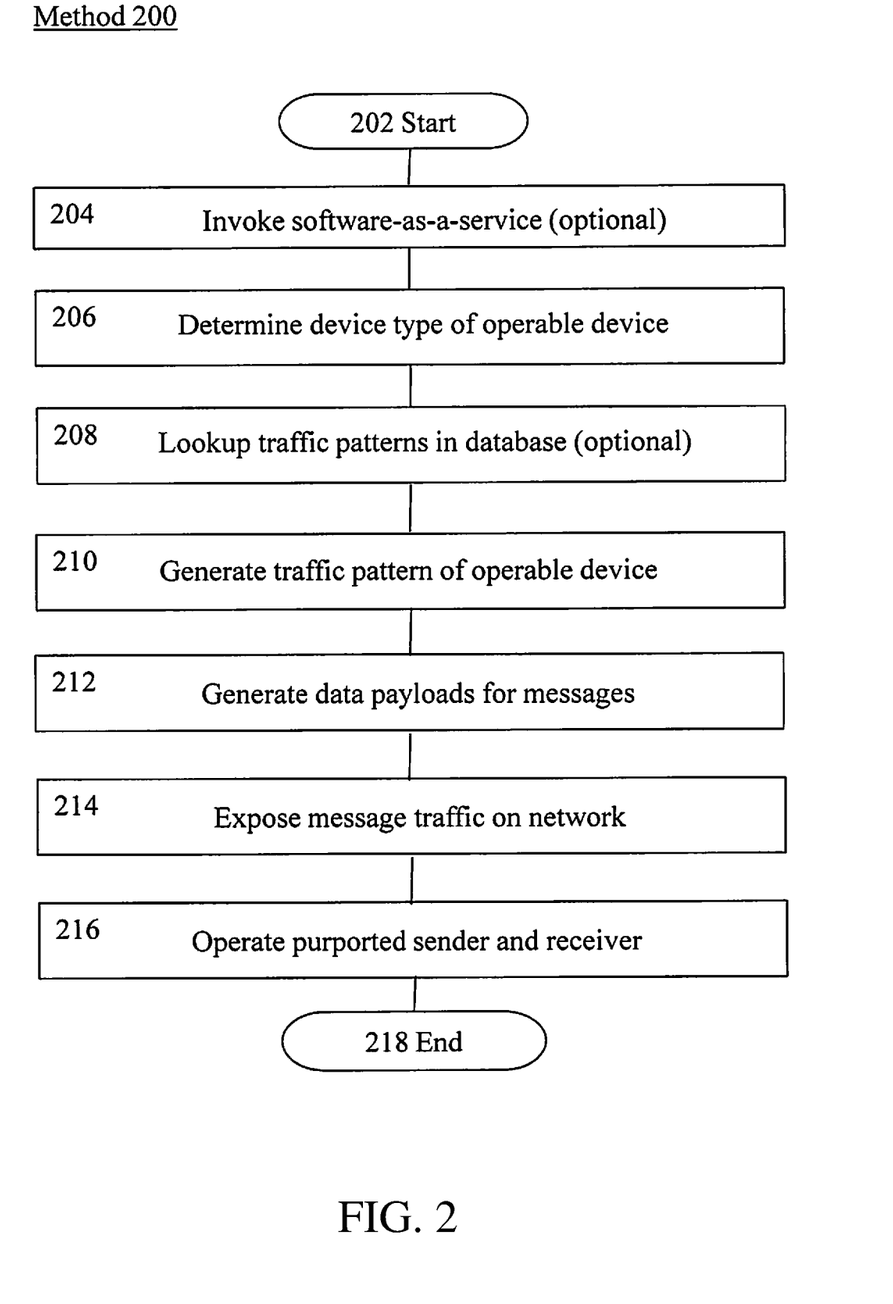
FIG. 2 shows a method of operation according to the presently described technology.

In FIG. 2 is shown an exemplary method 200 of operation according to one possible implementation of the present technology. The method begins at START 202, and at 204, if the technology is implemented in the form of "software-as-a-service", the service may be invoked. At 206, a device type that is operable on the wireless network is determined—for example, the network may be analysed to determine whether it supports certain types of wearable device. In one implementation, all operable devices may be enumerated from, for example, a support database, so that all the operable devices can be emulated to provide cover for those devices that are genuinely present on the network. Traffic patterns associated with each of the operable devices may be looked up on a database at 208. The database may be populated, for example, by patterns submitted by users of the service. In another implementation, traffic patterns may be derived from actual usage of devices in the local network, so that they can be replayed as required. Thus, at 210, a traffic pattern is generated for an operable device, at 212, data payloads for messages are generated, and at 214, the resulting message traffic is exposed on the network. The technology thus operates 216 a purported sender and receiver for each message in the generated spurious message traffic, and the process completes at END step 218. Following END step 218, as will be clear to one of skill in the art, the process may continue in further iterations. As will be clear to one of skill in the art, genuine devices may be attached to the network while the method described is in operation, and the message traffic that is generated comprises non-functional messages that are distinguishable by a network controller, but not by an outside observer, from normal messages and are arranged to avoid interfering with processing of normal messages in the wireless network. Rendering messages non-functional and thus distinguishable may be achieved, for example, setting the message destination to be the wireless access point, setting the destination to be a configured null-routing address, setting the destination to be an address of a virtualised device (one that has no physical existence) in the network, or by giving the message a characteristic the renders it non-routable. For example, a message may be made non-routable by giving it an invalid cyclical redundancy check value, by malforming the message structure, or the like.

Figure 3:
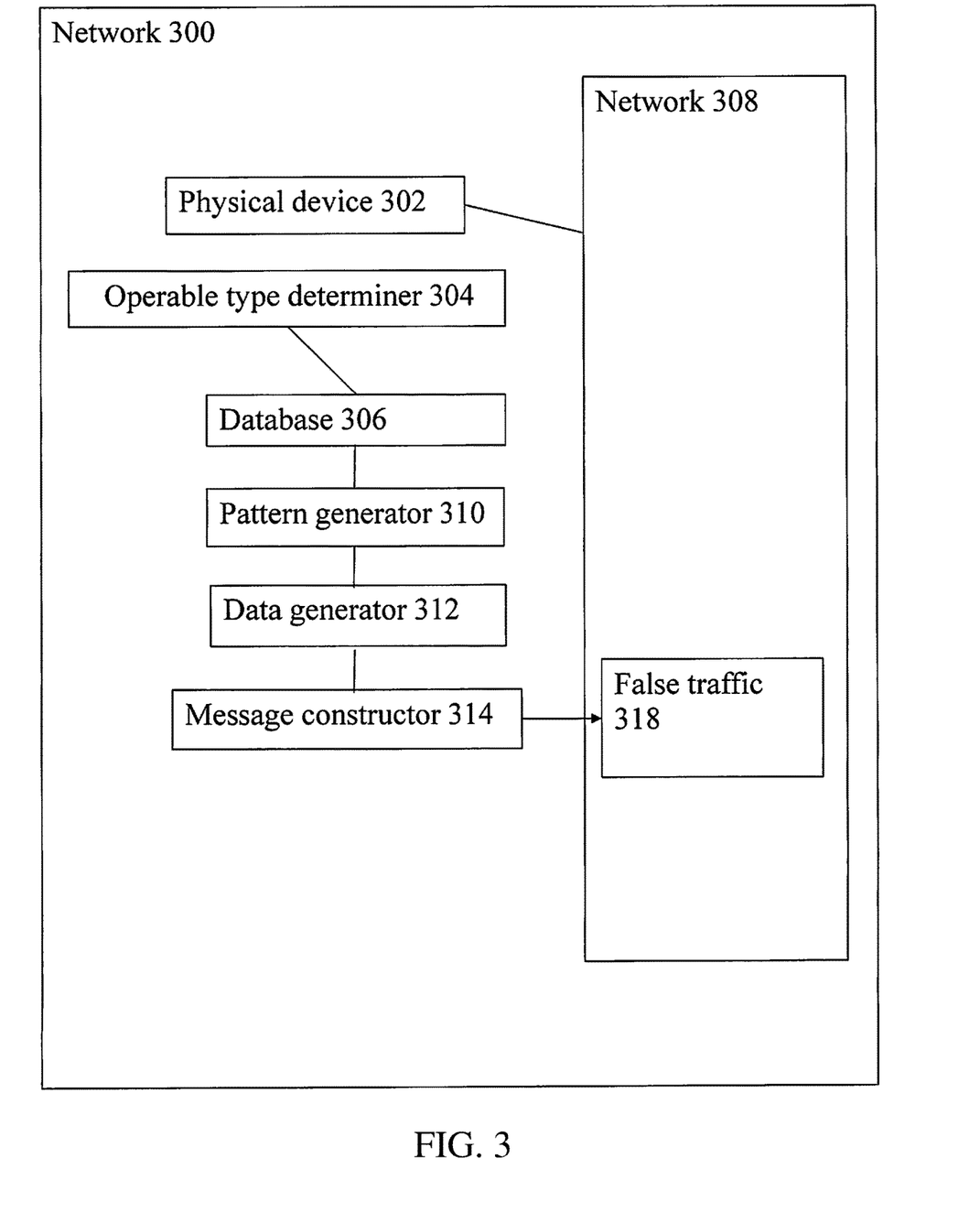
FIG. 3 shows an arrangement of hardware and software components by means of which the presently described technology may be implemented.

In FIG. 3 is shown an arrangement of hardware and/or software components in a network 300, giving a very simplified view of the components involved in an implementation operable to perform the method that was described above with reference to FIG. 2. The network 300 comprises one or more physical devices 302, operable to connect to network 308 and to send and receive genuine message traffic over the network 308. An operable type determiner component, 304 determines the types of device that are operable in the network 308, and optionally passes device type references to database 306, from which pattern generator 310 may obtain message traffic patterns relating to the operable device types determined by operable type determiner 304. In another implementation, pattern generator 310 may derive traffic patterns from other sources, including, for example, genuine traffic over network 308. The technology may thus be operable to analyse normal messages and generate a pattern of messages matching, for example, a timing pattern, a data payload pattern, etc., of the normal messages. Data generator 312 generates data payloads suitable for use in the generated spurious message traffic for the operable device types. Message constructor 314 takes the traffic patterns from pattern generator 310 and combines them with data payloads from data generator 312 to create false traffic 318 which is injected into network 308.

There is thus provided in implementations of the present technology a method, apparatus, computer program and distributed service for improving physical and electronic security in networks of electronic devices where the networks have wireless portions.

In the various implementations, the technology may thus obscure an attachment state of at least one physical device for a time. It may also obscure interaction behaviour patterns between a user and a physical device, between a physical device and an access point of the wireless network, and between one physical device and a peer physical device operable to attach to the wireless network.

In one implementation, the technology can be expanded to provide network homogenisation as a service to customers, where all locations and networks which use this service can present the same array of connected devices, with the service filling in the blanks by virtualising all the suitable devices which are not actually present on the network. In this way, no individual characteristics of any of the networks can be detected and exploited, as all the networks that use this service will appear the same to an electronic intruder.

Genuine-looking traffic patterns can be generated from metadata (timing, frequency, payload size, time of day, transmit power etc.), either observed from the network traffic of genuine attached devices, or downloaded from a database of patterns based on the device being emulated. The data payloads to be used in the emulations do not need to be stored, as they may comprise encrypted data, which can be generated randomly on the fly. This refinement drastically decreases the amount of data that needs to be stored. Patterns that may be observed and collected for this purpose may comprise packet timing, sizing, and network type, MAC address class patterns, symbol, modulation, bitrate and symbol strength patterns, patterns based on packet time-of-day dependency, and the like.

In a further refinement, users of the service might also upload metadata anonymously to contribute pattern information to the database. MAC addresses for virtualised devices could be generated by randomising the least significant bits of the MAC addresses of genuine observed versions.

This anonymization may be performed so that the metadata stored in the database cannot be used against to profile and target individual devices or users. Thus, aggregated communication patterns, the distribution of aspects like payload sizes and temporal distribution of packets, and the like, may be manipulated to generalise the data and metadata extracted from genuine messages. The generalised patterns may then be distributed to devices and modulated randomly to create packets that fall within expected distribution patterns (such as those of temporal data, RSSI data resulting from moving devices like health trackers, etc.).

The technology can also simulate user presence by compensating for the normally observable reduction in network traffic when the user leaves the location. For example, by generating purported traffic from a virtualised representation of a smartphone or wearable electronic devices, when the user leaves the network location, that absence becomes undetectable by an electronic eavesdropper accessing the network. The same technique may be used to generate purported network traffic from virtualised PIR sensors, or other traffic patterns indicative of the user being at home, for example, when the real sensors have been quiet for a while. This traffic can be generated by replaying events derived from the metadata observed from the genuine equivalent events.

If the present technology is implemented on the wireless access point, then it can prevent any of the false traffic from being routed out into the public internet. If another device is implementing the technology, then as the target address for the false packets is encrypted, the device can be configured such that all the packets terminate at the access point. This refinement prevents the technique from using internet bandwidth unnecessarily.

Further, by having multiple devices on the network which virtualise these false devices, an attacker could be prevented from using triangulation techniques to locate the source of the virtual devices and disambiguate them to distinguish the true traffic from the false.

In some variants of the present technology, there may be further provided a method and apparatus for defending devices in a wireless part of a network from malicious intrusion by detecting such intrusions using multiple false devices purporting to be real devices in the network. When an intruder references any of these false devices in a message, the system is alerted to the fact and can respond appropriately. In one implementation, a physical device may also be made operable to detect unsanctioned traffic referencing its own address. In implementations as described, the physical device address may comprise a pre-reserved period of network time and the falsely claiming may comprise taking control of a pre-reserved period of network time. In one arrangement, the access point device may be configured never to send functional messages to the physical or purported device, so that any received message claiming to be from the access point device must be, by definition, unsanctioned.

In one refinement of such a variant, the emitting an alert signal may comprise sending the signal over at least one of the wireless part of the network of electronic devices and a wired channel, where the detector component is operable to be connected by a wired channel to the network of electronic devices.

The emitting of an alert signal may comprise emitting a signal that the message is an unsanctioned message, and may comprise emitting the signal to an operator by a sensory signaller, which may be a visual or auditory signal. The emitting may additionally or alternatively comprise sending an operation request to cause at least one entity in the network of electronic devices to perform a remedial action. The emitting may comprise sending a contributory alert signal to contribute to a threat level assessment by a threat level assessor component.

The number of the plurality of purported or virtualised devices may be made to preponderate over the number of device addresses truly operable to connect at least one electronic device with at least one wireless access point device having an access point device address—thereby in effect flooding the network space with false traffic to confuse an attacker.

In one implementation of a variant, exposing at least one device address may further comprise collecting at least one behaviour pattern of at least one device having an address truly operable to connect at least one electronic device with at least one wireless access point device having an access point device address; and emulating the behaviour patterns using the at least one the device address falsely purporting to be an address operable to connect at least one the electronic device with at least one wireless access point device having an access point device address. The collecting of at least one behaviour pattern may comprise collecting at least one of a packet timing pattern, a packet sizing pattern, a packet network type pattern, a MAC address class pattern, a time-of-day packet dependency pattern, or any other pattern characteristics that can be used to produce a simulated traffic pattern for a device—for example, symbol patterns, modulation patterns, bitrate patterns, signal strength patterns or the like. Emulating the behaviour pattern may be achieved by injecting into the wireless part of the network of electronic devices at least one purported message using the derived patterns between the at least one device address and at least one of a wireless access point device address and a further device address. The purported message may comprise spurious data arranged in a data pattern derived from the at least one behaviour pattern. The spurious data thus does not risk disclosure of genuine user data, as it may be generated using nonsense data arranged in the derived pattern. As will be appreciated by one of skill in the art, the emulating may comprise emulating a member of a class of devices wherein the behaviour patterns are operable to be applied to a plurality of purported devices of the class of devices.

In one scenario, when the wireless part of the network of electronic devices comprises at least one entity not requiring authentication of at least one class of message, the class of message comprising deauthentication messages, the message falsely claiming to at least one of originate and terminate at one of the device address and the access point device address may be a deauthentication message, and the present technique at least in part addresses this issue. In one arrangement, the true access point device may be configured never to deauthenticate the physical or purported device that is arranged to detect intrusions. In another arrangement, the device could query the access point to determine if the received deauthentication was legitimate. Both these techniques would require some modification of the access point.

To avoid modification of the access point, the device could instead ignore the deauthentication frame and check whether the connection was actually terminated by the access point by sending test data. This could be done by, for example, sending test data back to the access point using the identity of the seemingly "terminated" connection, to determine whether an error or a ping reply is returned. It will be clear to one of ordinary skill in the art that the method to be used depends on the protocol. Some protocols ignore invalid packets without returning errors—in such cases it may be necessary to test by sending an encrypted or cryptographically authenticated ping to the access point address under the identity of the seemingly "terminated" connection. Additionally, the physical or purported device could be configured to inspect some signal metadata of the received deauthentication frame (e.g. signal strength, signal triangulation) and compare this with expected values measured or determined at configuration, installation, or run time of the physical or purported device to calculate a confidence that the frame sent by the access point was genuine. For example, in one arrangement, the device could be a physical device installed immediately adjacent to the access point, and therefore a particular (high) signal strength could be expected for any legitimate frames from the access point. In other cases, packets from the access point should be within a certain range of received signal strength indication (RSSI) values. If a deauthentication packet is received with a RSSI value above or below an expected signal strength range, that might indicate an attack.

In some implementations, rather than the detector component detecting a false claim as to the origin of a message, the detector component may be configured to detect other characteristics of "spoofed" messages.

In one such implementation, the method may comprise exposing over a wireless part of a network of electronic devices at least one device identifier appearing to be a physical device identifier operable to connect at least one electronic device with at least one wireless access point device having an access point device identifier. The detector component is configured to detect any message utilising a communication resource associated with the device identifier or the access point device identifier, to determine that the message falsely utilises the communication resource, and responsive to a positive determination, to emit an alert signal. The communication resource may comprise a channel ID, a session ID, a temporary ID, a code division multiple access (CDMA) code (e.g., a scrambling, spreading or access code), a communication timeslot, a communication frequency, or the like.

Figure 4:
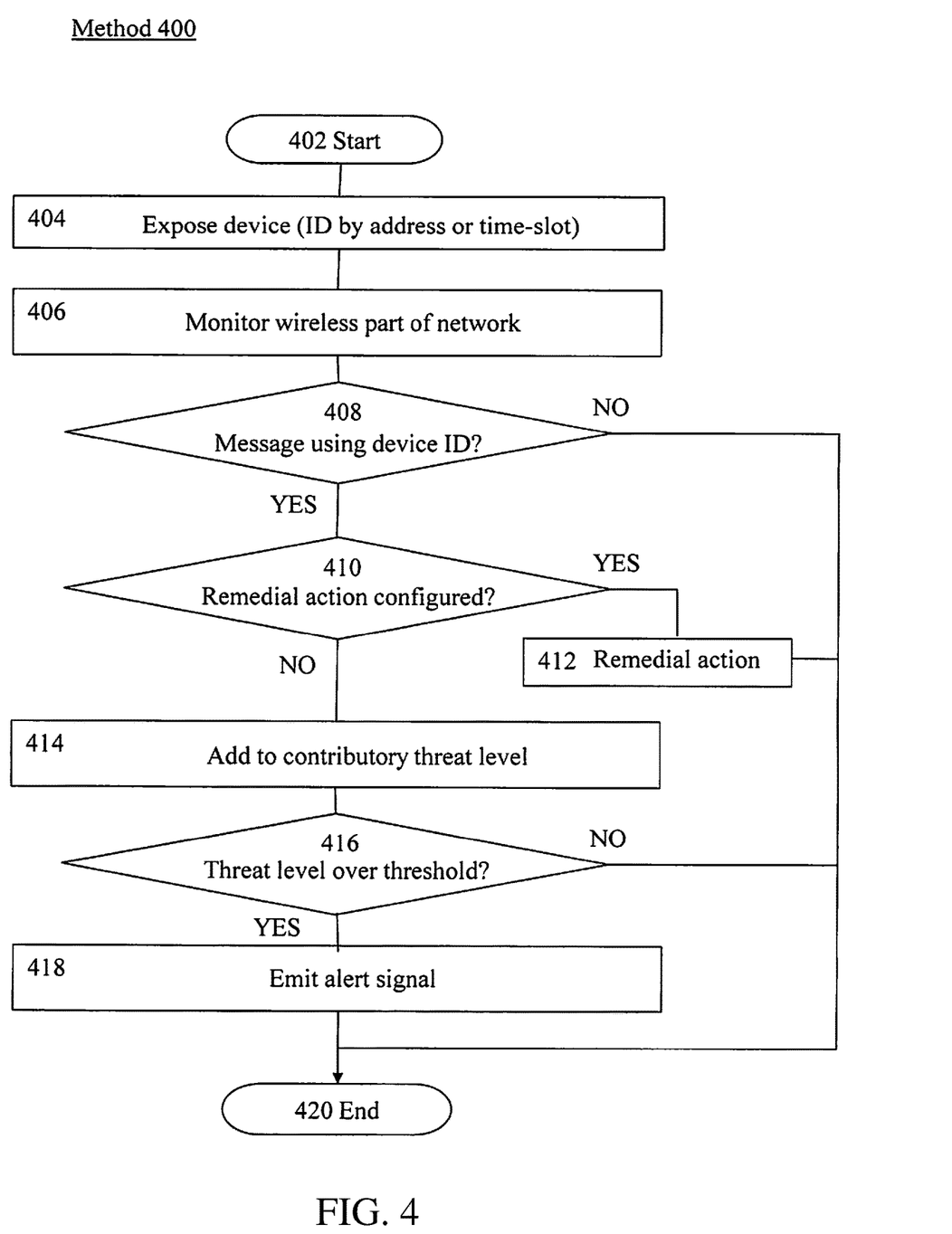
FIG. 4 shows a method of operation according to a further aspect of the presently described technology.

In FIG. 4 is shown an exemplary method 400 of operation according to one possible implementation of a further aspect of the present technology. The method begins at START step 402, and at step 404, a representation of a device, either a physical device or an emulation of such a device, is exposed to the wireless part of the network. The representation may be by means of an address, such as a MAC address, or may be by means of some other distinguishing characteristic, such as a device's pre-allocated time slot. At 406, the network traffic over the wireless part of the network is monitored, and at test 408, a test is performed to detect any message using the device address or other identifying characteristic, whether as the source of the message or as its destination. The test may be performed by any suitable form of detector component, whether embodied in hardware, software, or a combination of hardware and software, and elements of the detector component may be located at any level of the communications stack, and in any network termination or intermediate node. If no such message is detected, the process completes at END step 420. Following END step 420, as will be clear to one of skill in the art, the process may continue in a further iteration, either by entering at START step 402, or by iteration that portion of the process starting at 406, whereby the wireless part of the network continues to be monitored. If a message using the device address or other identifying characteristic is detected at 408, the system is checked at 410 for any action, such as a remedial action, that is configured to occur on detection of an unsanctioned message. If an action has been so configured, it is performed at 412, and the process passes to END step 420, to be iterated as necessary. Remedial actions within the system may include blocking of certain types of device traffic until the matter is resolved, or may take many other forms, as would be clear to one of skill in the art. Other actions, for example, real world actions, such as activating security cameras or applying additional locking mechanisms may be applied to increase physical protection for premises or property. If no immediate action has been configured, the NO branch from test 410 is followed, and the system increments a threat level by the contribution represented by this message. The threat level is tested at test 416 to determine whether it passes above a threshold threat level, which may be pre-set according to the requirements of the system. For example, a threat level threshold may be pre-set so that detection of a single unsanctioned message is sufficient to pass the threshold, or it may be that a single spurious message is a contributory factor to a cumulative threat level where the threshold is set at some value greater than one. If the threshold threat level is not detected as being passed at test 416, the process ends at END step 420, and may begin a further iteration of the method or part of the method as described above. If the threat level is detected as being passed at test 416, an alert signal is emitted at 418, and the process completes at END step 420, with the option of reiteration as configured.

Figure 5:
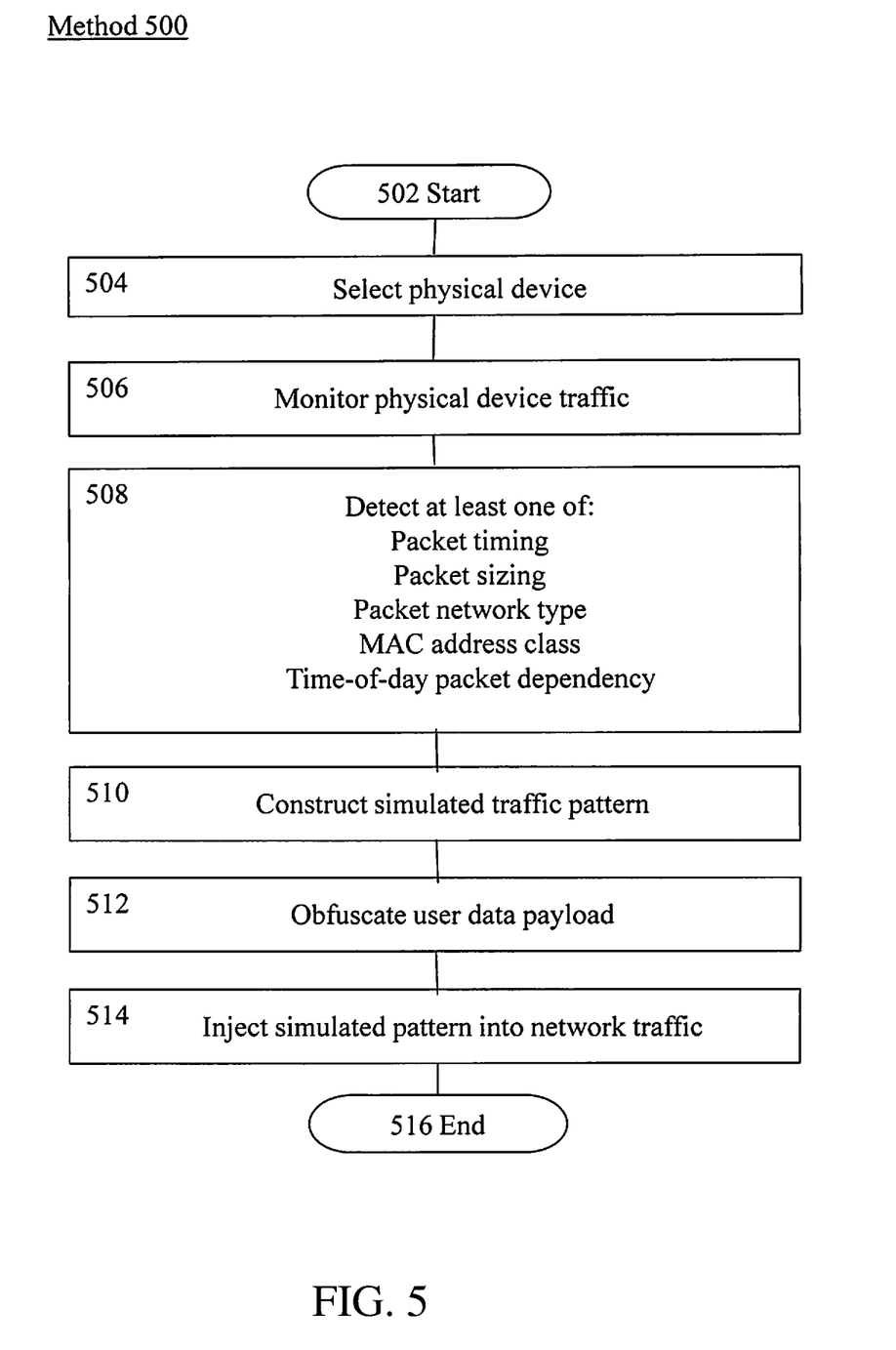
FIG. 5 shows a method of providing simulated message traffic for use in the method of operation of the embodiment of FIG. 4 and other embodiments of the further aspect.

In FIG. 5 is shown an embodiment of a method 500 of providing a representation of a device for use to detect unsanctioned message activity, starting at 502. At 504 a physical device is selected and at 506, the physical device's network traffic is monitored, to detect 508 at least one of a packet timing, a packet sizing, a packet network type, a MAC address class, a time-of-day packet dependency, or the like characteristic from which a simulated traffic pattern for a device of the class can be constructed at 510. Any user data payload is irrelevant to the purpose of the simulation, and should also not be unnecessarily exposed in the simulated traffic, and it is thus obfuscated at 512, whereby the external appearance of the payload has verisimilitude, but does not expose genuine user data. At 514, the simulated traffic pattern is injected into the network, where it does not perform any normal communication function, but is merely in existence to be observed by an unauthorised party and taken for reality. The process completes at END 516, and may be reiterated by the system as required.

Figure 6:
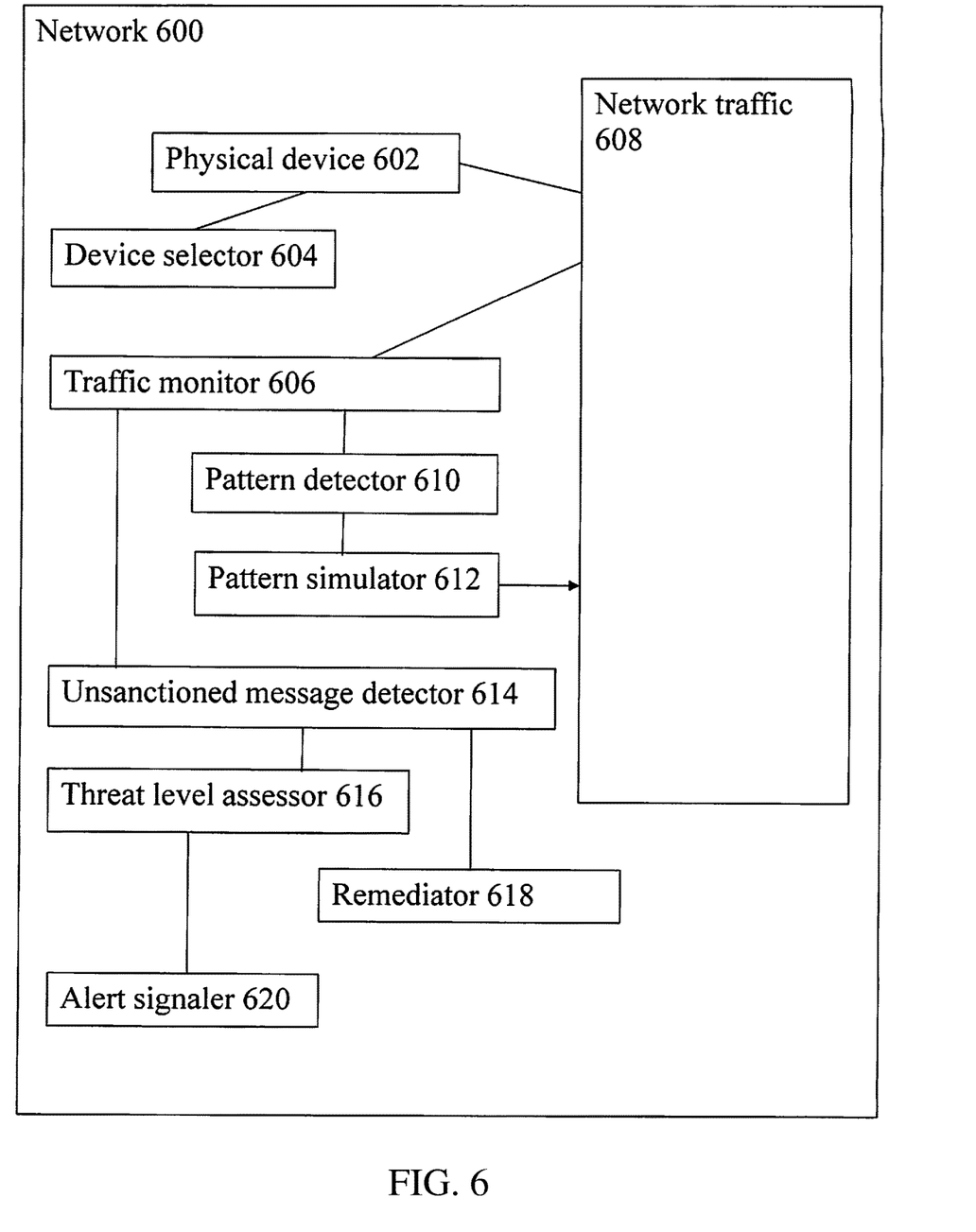
FIG. 6 shows an arrangement of hardware and software components by means of which the further aspect of the presently described technology may be implemented.

In FIG. 6 is shown an arrangement of hardware and/or software components in a network 600, giving a very simplified view of the components involved in an implementation operable to perform the method that was described above with reference to FIGS. 4 and 5. The network 600 comprises one or more physical devices 602, which may be selected by device selector 604. Selected devices 602 have their network traffic 608 monitored by traffic monitor 606, so that patterns of network traffic associated with selected devices 602 can be detected by pattern detector 610. Detected patterns are then used by pattern simulator 612. Traffic monitor 606 continues monitoring network traffic 608, and permits unsanctioned message detector 614 to detect when a message is passed on the network that contains the address, or uses the time slot, of a purported device. The detector component may be embodied in hardware, software, or a combination of hardware and software, and elements of the detector component may be located at any level of the communications stack, and in any network termination or intermediate node. Since no traffic of a true nature will ever use one of these addresses or time slots, the detected message is identified as unsanctioned by unsanctioned message detector 614, and if remediation is configured, remediator component 618 is brought into use to remedy the situation. This remediation may take any of the well-known forms for dealing with unauthorised message traffic, such as isolating all traffic from the offending source, fencing off portions of the network from access to sensitive data, and the like. If immediate remediation is not configured for this system, the level of threat posed by the unsanctioned message may be passed to threat level assessor 616, which may, for example, have a threshold setting beyond which an alert is signalled by alert signaller 620.

The present technology may further incorporate techniques for detecting unsanctioned messages, such as operational instruction messages, in networks of electronic devices where the networks have wireless portions. One such technique may be implemented as a machine-implemented method, comprising exposing over a wireless part of a network of electronic devices at least one device address appearing to be a physical device address operable to connect at least one electronic device with at least one wireless access point device having an access point device address; detecting by a detector component on the wireless part of the network of electronic devices a message referring to the at least one device address; determining by the detector component that the message falsely claims originate at one of the device address and the access point device address; and responsive to the determining, emitting an alert signal.

Said exposing may comprise exposing said at least one device address wherein said at least one device address falsely purports to be a said physical device address and said exposing may, additionally or alternatively, comprise exposing said at least one device address wherein said at least one device address is a said physical device address.

Emitting an alert signal may comprise sending said signal over at least one of said wireless part of said network of electronic devices and a wired channel connecting said detector component to said network of electronic devices. Emitting an alert signal may, additionally or alternatively, comprise emitting a signal that said message is an unsanctioned message, wherein said emitting may further comprise emitting said signal to an operator by a sensory signaller. Emitting said signal to an operator by a sensory signaller may also comprise emitting at least one of a visual and an auditory signal. Emitting may also comprise sending an operation request to cause at least one entity in said network of electronic devices to perform an action, wherein the action may be a remedial action.

Said emitting may further comprise sending a contributory alert signal to contribute to a threat level assessment by a threat level assessor component.

Said exposing over said wireless part of said network of electronic devices at said at least one device address may further comprise generating and exposing a plurality of said device addresses where each of said plurality falsely purports to be a said real address.

The number of said plurality may preponderate over the number of device addresses truly operable to connect at least one electronic device with at least one wireless access point device having an access point device address.

Said exposing at least one device address may further comprise: collecting at least one behaviour pattern of at least one device having an address truly operable to connect at least one electronic device with at least one wireless access point device having an access point device address; and emulating said behaviour pattern using said at least one said device address falsely purporting to be an address operable to connect at least one said electronic device with at least one wireless access point device having an access point device address.

Said collecting at least one behaviour pattern may comprise retrieving said behaviour pattern from a database of patterns associated with a type of said electronic device.

Said collecting at least one behaviour pattern may comprise collecting at least one of: a packet timing pattern; a packet sizing pattern; a packet network type pattern; a MAC address class pattern; a symbol pattern; a modulation pattern; a bitrate pattern; a signal strength pattern; and a time-of-day packet dependency pattern.

Said emulating may further comprise injecting into said wireless part of said network of electronic devices at least one purported message between said at least one device address and at least one of a wireless access point device address and a further device address, wherein said at least one purported message may comprise spurious data arranged in a data pattern derived from said at least one behaviour pattern.

Said emulating may comprise emulating a member of a class of devices, and wherein said behaviour patterns are operable to be applied to a plurality of purported devices of said class of devices.

Said wireless part of said network of electronic devices may comprise at least one entity not requiring authentication of at least one class of message, said class of message comprising deauthentication messages, and wherein said message falsely claiming to at least one of originate and terminate at one of said device address and said access point device address is a deauthentication message.

One further such technique may be implemented as a machine-implemented method, comprising: exposing over a wireless part of a network of electronic devices at least one device identifier appearing to be a physical device identifier operable to connect at least one electronic device with at least one wireless access point device having an access point device identifier; detecting by a detector component on said wireless part of said network of electronic devices a message utilising a communication resource associated with one of said device identifier and said access point device identifier; determining by said detector component that said message falsely utilises said communication resource; and responsive to said determining, emitting an alert signal.

Said communication resource may comprise at least one of: a channel ID; a session ID; a temporary ID; a CDMA code; a communication timeslot; and a communication frequency.

One further such technique may be implemented as an electronic apparatus comprising logic circuitry may be arranged to, in operation, perform all the steps of a method comprising: exposing over a wireless part of a network of electronic devices at least one device address appearing to be a physical device address operable to connect at least one electronic device with at least one wireless access point device having an access point device address; detecting by a detector component on the wireless part of the network of electronic devices a message referring to the at least one device address; determining by the detector component that the message falsely claims originate at one of the device address and the access point device address; and responsive to the determining, emitting an alert signal.

One further such technique may be implemented as a computer program comprising computer program code to, when loaded into a computer and executed thereon, cause said computer to operate logic circuitry to perform all the steps of perform all the steps of a method comprising: exposing over a wireless part of a network of electronic devices at least one device address appearing to be a physical device address operable to connect at least one electronic device with at least one wireless access point device having an access point device address; detecting by a detector component on the wireless part of the network of electronic devices a message referring to the at least one device address; determining by the detector component that the message falsely claims originate at one of the device address and the access point device address; and responsive to the determining, emitting an alert signal.

One further such technique may be implemented as a computer-implemented method of deploying a service comprising steps of deploying computer program code operable to, when deployed into a computer network and executed thereon, cause components of said computer network to operate logic circuitry to perform all the steps of a method comprising: exposing over a wireless part of a network of electronic devices at least one device address appearing to be a physical device address operable to connect at least one electronic device with at least one wireless access point device having an access point device address; detecting by a detector component on the wireless part of the network of electronic devices a message referring to the at least one device address; determining by the detector component that the message falsely claims originate at one of the device address and the access point device address; and responsive to the determining, emitting an alert signal.

As such, the present technology may enable mechanisms for detecting wireless impersonation attacks, including wireless deauthentication attacks, by simulating the presence and behaviour of devices that may not be physically present in the network, generating supposed traffic involving these purported or virtualised devices and detecting any other traffic purporting to be to or from these, in reality, non-existent devices—if such network traffic is detected, it is known immediately that it is unsanctioned and must be spurious. This is because all sanctioned traffic to and from such virtual devices has been generated and is therefore known in advance. Metaphorically, the purported or virtualised devices act like the canary taken underground by old-time miners to detect toxic gases—the canary would succumb to the effects of gas before it could affect the miners, and would thus provide an early warning of danger without placing a miner at risk—so here the purported or virtualised devices may suffer the effects of an attack, provide warning, and protect the true devices in the network.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a non-transitory computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method to operate a wireless network, comprising:
   determining at least one device type of at least one physical device operable to be at least intermittently attached to a wireless network;
   generating a pattern of wireless network activity associated with said at least one device type;
   exposing over said wireless network a plurality of non-functional messages conforming to said pattern said non-functional messages distinguishable by a network controller from normal messages and arranged to avoid interfering with processing of normal messages in said wireless network; and
   operating a purported sender and receiver of each of said plurality of messages to obscure at least one of an exploitable characteristic and an exploitable state of said at least one device type with respect to said wireless network;
   said exposing comprising making a message non-functional and distinguishable by one of:
      setting a message destination to an access point address of said wireless network,
      setting said message destination to a configured null-route address,
      setting said message destination to an address of a virtualized device in said wireless network, or
      giving said message a non-routable characteristic.

2. The method of claim 1, said giving said message a non-routable characteristic comprises giving said message at least one of an invalid cyclical redundancy check value and a message structure malformation.

3. The method of claim 1, at least one physical device of said device type being attached to said wireless network during said exposing.

4. The method of claim 1, said generating comprising analysing normal messages and generating a pattern of messages matching at least one timing pattern of said normal messages.

5. The method of claim 1, said generating comprising analysing normal messages and generating a pattern of messages matching at least one payload data pattern of said normal messages.

6. The method of claim 1, said obscuring at least one of an exploitable characteristic and an exploitable state comprising obscuring an attachment state of at least one said physical device for a time.

7. The method of claim 1, said obscuring at least one of an exploitable characteristic and an exploitable state comprising obscuring an interaction behaviour pattern between a user and at least one said physical device.

8. The method of claim 1, said obscuring at least one of an exploitable characteristic and an exploitable state comprising obscuring an interaction behaviour pattern between said physical device and an access point of said wireless network.

9. The method of claim 1, said obscuring at least one of an exploitable characteristic and an exploitable state comprising obscuring an interaction behaviour pattern between said physical device and a peer physical device operable to attach to said wireless network.

10. The method of claim 1, said generating comprising retrieving at least one pattern from a database of patterns associated with said at least one device type.

11. The method of claim 10, further comprising collecting at least one pattern of at least one electronic device in said wireless network for storage in said database.

12. The method of claim 11, said collecting at least one behaviour pattern comprising collecting at least one of:
   a packet timing pattern;
   a packet sizing pattern;
   a packet network type pattern;
   a MAC address class pattern;
   a symbol pattern;
   a modulation pattern;
   a bitrate pattern;
   a signal strength pattern; and
   a time-of-day packet dependency pattern.

13. The method of claim 12, said generating further comprising generalising message-specific data to create at least one reusable pattern for storage in said database.

14. An electronic apparatus comprising logic circuitry arranged to, in operation:

determine at least one device type of at least one physical device operable to be at least intermittently attached to a wireless network;

generate a pattern of wireless network activity associated with said at least one device type;

expose over said wireless network a plurality of non-functional messages conforming to said pattern said non-functional messages distinguishable by a network controller from normal messages and arranged to avoid interfering with processing of normal messages in said wireless network; and operate a purported sender and receiver of each of said plurality of messages to obscure at least one of an exploitable characteristic and an exploitable state of said at least one device type with respect to said wireless networks;

said exposing comprising making a message non-functional and distinguishable by one of:
    setting a message destination to an access point address of said wireless network,
    setting said message destination to a configured null-route address,
    setting said message destination to an address of a virtualised device in said wireless network, or
    giving said message a non-routable characteristic.

15. A computer program product tangibly stored on a non-transitory medium comprising computer program code to, when loaded into a computer and executed thereon, cause said computer to operate logic circuitry to:

determine at least one device type of at least one physical device operable to be at least intermittently attached to a wireless network;

generate a pattern of wireless network activity associated with said at least one device type;

expose over said wireless network a plurality of non-functional messages conforming to said pattern, said non-functional messages distinguishable by a network controller from normal messages and arranged to avoid interfering with processing of normal messages in said wireless network; and operate a purported sender and receiver of each of said plurality of messages to obscure at least one of an exploitable characteristic and an exploitable state of said at least one device type with respect to said wireless network, said exposing comprising making a message non-functional and distinguishable by one of:
    setting a message destination to an access point address of said wireless network;
    setting said message destination to a configured null-route address;
    setting said message destination to an address of a virtualised device in said wireless network; or
    giving said message a non-routable characteristic.

16. A computer-implemented method of deploying a service comprising steps of deploying computer program code operable to, when deployed into a computer network and executed thereon, cause components of said computer network to operate logic circuitry to:

determine at least one device type of at least one physical device operable to be at least intermittently attached to a wireless network;

generate a pattern of wireless network activity associated with said at least one device type;

expose over said wireless network a plurality of non-functional messages conforming to said pattern said non-functional messages distinguishable by a network controller from normal messages and arranged to avoid interfering with processing of normal messages in said wireless network; and operate a purported sender and receiver of each of said plurality of messages to obscure at least one of an exploitable characteristic and an exploitable state of said at least one device type with respect to said wireless network;

said exposing comprising making a message non-functional and distinguishable by one of:
    setting a message destination to an access point address of said wireless network,
    setting said message destination to a configured null-route address,
    setting said message destination to an address of a virtualised device in said wireless network, or
    giving said message a non-routable characteristic.

* * * * *

UNITED STATES PATENT AND TRADEMARK OFFICE
CERTIFICATE OF CORRECTION

| | |
|---|---|
| PATENT NO. | : 10,924,934 B2 |
| APPLICATION NO. | : 16/191024 |
| DATED | : February 16, 2021 |
| INVENTOR(S) | : Samuel Marc Town et al. |

Page 1 of 1

It is certified that error appears in the above-identified patent and that said Letters Patent is hereby corrected as shown below:

In the Claims

Column 15, Line 16, Claim 14:
Delete "networks" and insert --network--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*